United States Patent [19]

Gannett

[11] 3,924,075

[45] Dec. 2, 1975

[54] TWO-WAY PRIVACY SYSTEM TERMINAL WITH SINGLE KEY PULSE GENERATOR MEANS

[75] Inventor: Danforth K. Gannett, Mountain Lakes, N.J.

[73] Assignee: Bell Telephone Laboratories, Incorporated, Murray Hill, N.J.

[22] Filed: Mar. 20, 1947

[21] Appl. No.: 735,942

[52] U.S. Cl. .............................. 179/1.5 R; 178/22

[51] Int. Cl.² .............................. H04L 9/02

[58] Field of Search ............ 178/17.5, 22, 70, 69.5; 179/1.5, 15, 1.5 R; 250/6.6, 27 C

[56] References Cited

UNITED STATES PATENTS

| | | | |
|---|---|---|---|
| 1,332,976 | 3/1920 | Dowd | 178/17.5 |
| 2,175,573 | 10/1939 | Schroter | 250/27 C |
| 2,245,364 | 6/1941 | Riesz et al. | 250/27 C |
| 2,401,405 | 6/1946 | Bedford | 178/69.5 |
| 2,406,165 | 8/1946 | Schroeder | 179/15 A |

*Primary Examiner*—Malcolm Hubbler
*Attorney, Agent, or Firm*—H. A. Burgess

EXEMPLARY CLAIM

7. In a privacy system, a terminal comprising a transmitter of enciphered message signals and a terminal-identifying signal, means for supplying coded key pulses to said transmitter for enciphering outgoing message signals, means for selectively generating a plurality of different terminal-identifying signals for transmission one at a time with enciphered message signals, so that for successive selected intervals the identifying signal assigned to the terminal may be changed, and means responsive to said last-mentioned means for correspondingly selectively coding the pulses supplied to the transmitter to a respective one of a like number of different codes upon selective generation of a different identifying signal for the terminal.

8 Claims, 4 Drawing Figures

INVENTOR
D. K. GANNETT
BY
Robert J. Fluskey
ATTORNEY

TWO-WAY PRIVACY SYSTEM TERMINAL WITH SINGLE KEY PULSE GENERATOR MEANS

The present invention relates to signal transmission with privacy, in which secret key currents are used for enciphering outgoing signals and duplicate key currents are used for deciphering the secretly sent signals.

The present invention relates to the generation of key currents at a two-way terminal, by way of example, and to the supply of a key wave to the transmitter for enciphering the outgoing signals, and the supply of a key wave to the receiver in the proper time relation to enable the received signals to be deciphered.

In a long radio or wire transmission link the transmission time between terminals may be appreciable. There is also circuit delay in the terminals themselves due to the filters, stepping circuits and similar parts, so that the total transmission time is enough to require that the application of the key waves at the receiver shall be delayed with respect to the time of application of the duplicate waves at the distant transmitter. Where a single source of key waves is to be used at a two-way terminal for both the transmitting and receiving sides of the system, the round-trip delay must be taken into consideration. The use of a single source of key waves instead of two separate sources is desirable where other considerations permit, on account of the saving in equipment that can be realized.

In accordance with the present invention, use of a single source of key waves is made feasible together with a type of delay circuit capable of effecting the required delay in applying the key wave to the receiving circuit.

The invention will be disclosed specifically as embodied in a two-way radio telephone system in which the key currents for the transmitter and receiver at the same terminal are derived from a common key source. In this disclosure, transmitting-receiving (TR) switches are shown to be operated by a push-to-talk button on the telephone set to insure that only the transmitting or only the receiving side of the station is operative at one time. This feature is useful, for example, in conference systems in which the same key is used at all stations in the system. Provision is also disclosed for using duplicate key generators at all stations, but for altering the key that is sent out from a station so that each station of a system may use a distinctive key, and for enabling each station when receiving to switch over to the appropriate key to receive the signals from whichever station is sending. Provision is also made for changing the station or terminal-identifying signal associated with a particular station, and simultaneously changing the key sent out from the station.

The invention will be more fully understood and its objects and features will appear more fully from the following detailed description, in connection with the accompanying drawing in which.

Figures 1, 2, 3, 4:
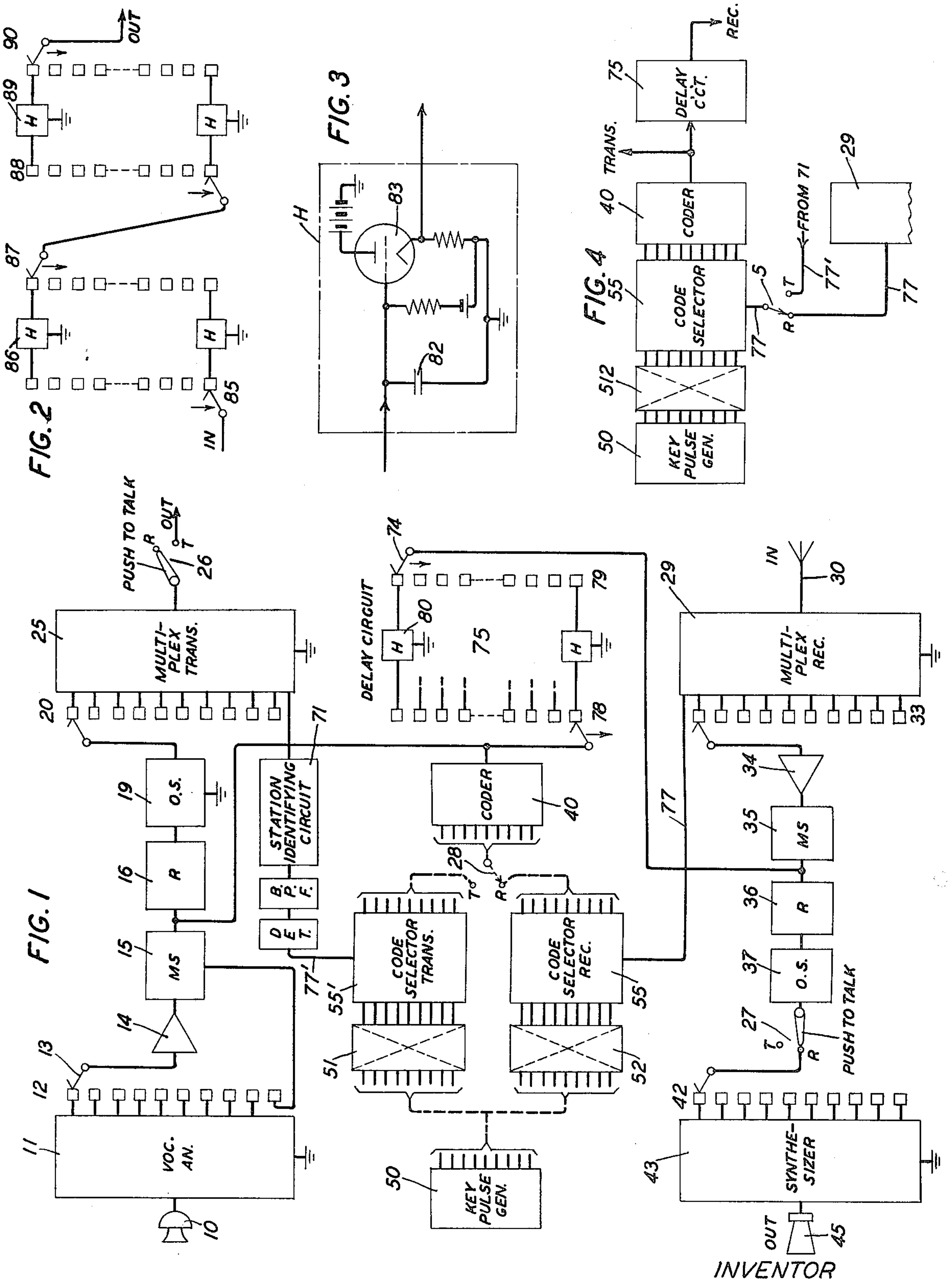
FIG. 1 is a block schematic circuit diagram showing the manner of applying the invention to a two-way terminal.
FIG. 2 is a block schematic diagram of a modification of the delay circuit.
FIG. 3 is a detail circuit schematic of a type of holding circuit that is used in the delay circuit.
FIG. 4 shows a modification of the key generator and coder arrangement of FIG. 1.

FIG. 1 is similar in general outline to FIG. 1 of my prior application, Ser. No. 592,964, filed May 10, 1945, for Signal System except as the FIG. has been modified to show the inclusion of the present invention. In my previous application disclosure, a pulse generator served in common for the key generators supplying key currents to the transmitting and receiving sides of a two-way terminal. Separate coders were provided for the transmitting key and for the receiving key and the delay in the receiving key was introduced in the pulses supplied by the pulse generator to the receiving coder. The transmitting and receiving coders are relatively complex apparatus units, and the present invention, by eliminating the use of one of these units, results in a considerable saving in equipment. In the system of the present invention, the delay in the receiving key is introduced on the output side of the coder at a point between the coder output and the receiving circuit.

Referring more particularly to FIG. 1, the voice input, such as a microphone or incoming telephone line, is shown at 10 leading to a Vocoder analyzer 11. This is followed, as in my previous application, by a distributor 12, amplifier 14, message stepper 15, reentry 16, output stepper 19 and distributor 20. The distributor 20 leads to the multiplex transmitter which may include individual frequency modulated oscillators and band filters as in my prior application, but which in the present instance are represented by the box 25. The single output from the multiplex transmitter leads through a TR switch 26 to a suitable output such as a radio transmitter (not shown).

These parts may be identical with the corresponding parts in my previous application, and their operation is the same in both cases. The speech waves are analyzed at 11 into a number of low frequency component currents existing simultaneously in a plurality of Vocoder channels shown terminating on the distributor segments 12. These are scanned by the brush 13 at a rate of 500 contacts per second, by way of example. These short fragments of the signals in the Vocoder channels are passed into the message stepper 15, which quantizes the signal into one of six possible values, which may be called steps 0 to 5. The reentry circuit 16 is supplied with these quantized signals. A key signal, also quantized, derived from the coder 40, is added to each quantized signal fragment and, where necessary, the summation valve is reentered to give an enciphered output also varying in steps from 0 to 5 steps. This is passed to the output stepper 19, and the individual enciphered signal fragments are distributed over the segments of the distributor 20 to the individual channels of the multiplex transmitter.

The showing of the distributors 12 and 20 is diagrammatic only since in practice these distributors would generally not be of mechanical type, but would be electronic in character, or may comprise electronic ring circuits actuating relays, as more fully disclosed in R. L. Miller application, Ser. No. 542,975, filed June 30, 1944, to which reference may be made for a more detailed disclosure, not only of the commutators, but of the steppers and reentry circuit.

The receiving side of FIG. 1 comprises an incoming circuit 30 which may lead from a radio receiver or the like to the multiplex receiving terminal 29. The latter comprises separating band filters and frequency modulation detectors, as in my previous application, for separating the signals into individual channels terminating on the segments of distributor 33. The "brush" of this distributor leads through an amplifier 34, message stepper 35, reentry 36 and output stepper 37 to the output distributor 42, the segments of which connect to the individual channels of the Vocoder synthesizer 43. A suitable voice output such as the speaker 45 is shown connected to the output side of the synthesizer. These parts may be duplicates of the corresponding parts of my previous application. A transmit-receive (TR) switch has been shown inserted at 27 between output stepper 37 and distributor 42.

The received enciphered signals are send individually through the message stepper 35 and are combined in the reentry 36 with key signals derived in this case from the brush 74 of the delay circuit 75, to be described presently. These key pulses are identical with the key pulses used at the distant station for enciphering the signal, and are combined with the received signals in such a way as, in effect, to subtract or cancel the key and leave the pure signal. The synthesizer 43 operates as described in my previous application to reconstruct understandable speech waves from the individual components transmitted to it by way of the distributor 42, which components resulted from the analysis of the input speech waves at the distant terminal.

In order to supply the key waves or key pulses to both the transmitting reentry 16 and the receiving reentry 36, a common key pulse generator 50 is used. This may be of any suitable type such, for example, as the multiple disc light valve or shutter type disclosed in A. E. Melhose application, Ser. No. 555,912, filed Sept. 27, 1944, and referred to in my previous application. The nine leads coming from the key pulse generator 50 are shown divided into two branches, one branch of which extends through a cross-connecting panel 51 and a TR switch 28 to the coder 40, and the other branch of which extends through the cross-connecting panel 52, code selector 55 and TR switch 28 to the coder 40. The key pulse generator 50 puts out two-valued pulses varying in irregular order on each of the nine output leads, and it is the function of the coder 40 to build from these two-valued pulses a single key wave comprising six-valued pulses varying in step value in random manner and occurring at 500 pulses per second. This coder may be of the type disclosed, for example, in my prior application Ser. No. 555,913 filed Sept. 27, 1944, to which reference may be made for a complete disclosure.

The code selector 55 may be identical with the corresponding part fully disclosed in my previous application Ser. No. 592,964 referred to, and includes a set of relays each capable of connecting nine input leads to nine output leads in a different characteristic manner. There may, for example, be six of these code selector relays assuming a six-station system. These relays are operated one at a time from a special channel derived from the multiplex receiver 29 over lead 77.

Each transmitting station includes a station identifying circuit 71 which is set to send out an individual frequency for each station. When this station identifying wave is received in the multiplex receiver 29, and the corresponding indication is sent over lead 77 to the code selector 55, it actuates selectively an individual code selecting relay identified with the frequency of the station identifying wave. This relay, when actuated, makes a certain predetermined interconnection between the nine input leads and nine output leads of the code selector 55 in such manner as to predetermine an output key from the coder 40 of suitable type to decipher the message being sent from the particular transmitting station. During such receiving time, all of the TR switches are in the R position including TR switch 28, which is in reality a nine-conductor switch. Thus the nine conductors leading from the cross-connecting panel 51 to the coder 40 are interrupted at 28 during receiving conditions, and the code generated in coder 40 is determined by the selection made at 55 in the manner described.

When the station shown in the FIG. starts to talk and the talker presses the push-to-talk button, all of the TR switches are thrown to the T-position, including the nine-conductor switch 28. The coder 40 then puts out a code which is determined by the connections in the panel 51. These connections may be changed manually from time to time, such as once a day in accordance with a program. Also, the setting of the individual station identifying circuits 71 may be changed from time to time, as may also be the cross-connections in panel 52. It is necessary, of course, to coordinate these settings at the different stations.

In the transmitting condition it is seen, therefore, that a transmitting code is supplied to the reentry 16. Incidentally, this same code is supplied through the delay circuit 75 to the reentry 36, but this is without effect in the receiver 45 since the switch 27 is in the open or T-position whenever the transmitting key is being supplied. The receiving times, but this also is without effect, since the transmitter is disabled during receiving times by the fact that the switch 26 is in the R position.

Automatic selection of transmitting or sending key or code may be provided in the described arrangement by inclusion of the code selector 55′, similar to and operating on the same principles as the code selector 55, in the path between the cross-connections panel 51 and the coder 40. The code selector relays of the code selector 55′ are controlled over connection 77′ by the setting of the multiple-position slider or switch (not shown) of the station-identifying circuit 71, here assumed applied to a six-station system. The circuit 71, therefore, supplies current not only for transmission out of the station as a station-identifying signal, but also to the code selector 55′ through a suitable band-pass filter (BPF) and detector circuit (DET) for control of the relays thereof in accordance with the respective station-identifying signal. By adjustment of the position of the slider or switch in circuit 71 from one position to another, in accordance, for example, with a prearranged program for the stations or terminals of the privacy system, the code generated in coder 40 is determined by the selection made in the code selector 55′, and both the transmitting key or code and the station-identifying signal are simultaneously shifted and transmitted (assuming that the TR switch is adjusted to the I- or transmit position).

Coming now to the delay circuit 75, which determines the amount of time delay introduced in the receiving key between its generation at the output of coder 40 and its application to the reentry 36, this comprises an input distributor 78 and an output distributor 79, the brush 74 of which lags behind the brush of the distributor 78 by an adjustable amount. Each segment of the distributor 78 is connected through a corresponding holding circuit 80 with a corresponding segment of the distributor 79. As the input brush sweeps over the segments of distributor 78, it supplies a separate key pulse in succession to each of the holding circuits 80, each of which serves to maintain on the corresponding segment of the output distributor 79 the stored key voltage until the input distributor brush again makes contact with the same segment and places a different value of key pulse on the holding circuit. Assuming 500-cycle pulses, each pulse is of 2-milliseconds duration, and if there are twenty distributor segments, the period of revolution of each distributor is 40 milliseconds. The brush 74 may have a maximum delay in this case of 19 segments or 38 milliseconds, and it may have any smaller delay down to 2 milliseconds, depending on the lag in brush 74 behind the input brush.

A suitable type of holding circuit for use at 80 is diagrammed in FIG. 3 as comprising a vacuum tube 83 having a capacity 82 in its grid circuit for receiving the charges from the segments of the input distributor. This condenser holds its charge for a complete rotation of the brush, and until the brush again places a charge on it. The tube 83 is connected by a cathode-follower type of circuit to the output, and the adjustments are such that when the charge on the condenser 82 is zero, the output voltage is also zero, but, as the charge builds up step by step, the output increases also in corresponding manner.

As in the case of the other distributors previously referred to, the distributors 78 and 79 may comprise electronic distributors, or may be of the electronic ring-relay type shown in the Miller application referred to. In the latter case, the amount of additional equipment required is very small since it may consist merely of extra relay contacts on the relays in the distributors in the main transmission channel such as 33 or 42.

If it is desired to obtain a delay time equivalent (about) to that of a twenty-segment distributor in the delay circuit 75 when the distributors in the transmission channel are ten-segment distributors, the type of circuit shown in FIG. 2 may be used. This circuit is capable of giving nearly the same delay as a twenty-segment distributor delay circuit but employs only ten-segment distributors. This comprises two delay circuits in tandem, the first comprising input distributor 85, holding circuits 86 and output distributor 87, and the second including input distributor 88, holding circuits 89 and output distributor 90. A maximum delay of nine segments is obtainable in the first distributor since the brush of distributor 87 can lag the brush of distributor 85 by nine segments. A similar delay of nine segments can be obtained in the second distributor, making a total of eighteen segments or 36 milliseconds. The brush of distributor 87 is connected to the brush of distributor 88, so that each key pulse is stored in a holding circuit 86 and is again stored in a holding circuit 89. Any lesser delay is of course obtainable by shifting the relative positions of the distributor brushes.

The construction shown in FIG. 2 lends itself readily to a case where electron ring-relay distributors of the Miller type are employed since it involves only the addition of extra relay armatures and contacts to the existing distributor relays together with the holding circuits 86 and 89.

The adjustment of the delay may be considerably simplified and in a sense be made automatic by having the distributor 85 driven from the same source as that for the distributors 12 and 20 and simultaneously therewith, and by having the distributor 87 driven from the same source as that for and simultaneously with the distributors 33 and 42. The distributors 88 and 90 of the second unit of delay may be similarly associated with either the distributors 12 and 20, or the distributors 33 and 42. The sections 88 and 90 would give a fixed delay preferably just equal to the transmission delay in the equipment only. When, therefore, the receiving equipment at the station is either advanced or retarded in order to synchronize it with the sending equipment at a distant station or terminal, the key for the receiving equipment will also be advanced or retarded the same amount, and will remain in correct relationship with its own station or terminal.

FIG. 4 shows an arrangement applicable to a system such as is shown in FIG. 1, for supply of selectively variable transmitting key, corresponding to selective variation or change in station-identifying signal assigned to a terminal or station of a multistation privacy system, and selectively variable receiving key, corresponding to variation or change in the station-identifying signal incoming to the receiver of the terminal from another terminal or station in the system. In comparison with the key supply arrangement of FIG. 1, that of FIG. 4 comprises a single key pulse generator 50, a single cross-connections panel 512 (instead of two: 51, 52), a single code selector 55 (instead of two: 55,55′) and a single coder 40. Tr switch 5, adjustable to T- or transmit position and to R- or receive position simultaneously with respective adjustments of TR switches 26, 27 (TR switch 28 not being required with the arrangement of FIG. 4), is provided between the code selector equipment and the connection 77′ from the station-identifying circuit 71 and the connection 77 from the multiplex receiver 29. In the receive condition, as illustrated, the station-identifying signal incoming to the multiplex receiver 29 is detected, and the control current thereby obtained causes operation of the code selector to establish the cross-connection between the key pulse generator (through panel 512) and the coder whereby the latter supplies to the receiver (through the delay circuit 75) the key respective to the particular incoming station-identifying signal. In the transmit condition, with the switches 5, 26, 27 adjusted to T-position, control current respective to the slider position of the signal determining switch of the station-identifying circuit 71, is furnished to the code selector over connection 77′ through switch 5, to cause operation of the code selector to establish the cross-connection between the key pulse generator, through panel 512, and the coder, whereby the latter supplies to the transmitter the key respective to the particular outgoing station-identifying signal. Change of the setting of the signal determining switch of the circuit 71, automatically changes the control current input to the code selector to produce a respective change in the key supplied to the transmitter.

Although disclosed with reference to a specific application, it will be apparent to the skilled in the art that the invention is not limited thereto, but may be otherwise embodied without departure from the spirit and scope thereof.

What is claimed is:

1. In a privacy system, a plurality of transmission channels over which signal components are received, a multichannel synthesizing circuit for reconstructing signals under control of said received components, a common deciphering equipment for all of said transmission channels, a key generator therefor, a plurality of delay devices, and unitary distributor means having four sets of circuit controlling distributor means operating in unison, a first set distributing the received signal components from the various transmission channels in sequence to said common deciphering equipment, a second set distributing signals from said common deciphering equipment sequentially to channels of said synthesizer, a third set distributing key currents from said key generator to said delay devices seriatim, and the fourth set distributing delayed key currents from individual delay devices to said common deciphering equipment for use in deciphering the received signal components.

2. In a two-way privacy system, a two-way terminal comprising a transmitter and a receiver, a common key generator for said transmitter and receiver, means for supplying key pulses from said generator to said transmitter for enciphering outgoing signals and to said receiver for deciphering incoming signals, means for selectively generating a plurality of different terminal-identifying signals for transmission out from said transmitter with the enciphered outgoing signals for differently identifying the terminal at selected intervals, and means responsive to each different identifying signal generated for selectively coding the pulses supplied to said transmitter for enciphering purposes in a respective one of a like number of different codes.

3. In a two-way privacy system, a plurality of two-way terminals each comprising a transmitter and a receiver, a common key generator for said transmitter and receiver for providing duplicate series of key pulses at each terminal, means for supplying coded key pulses from said generator to said transmitter for enciphering outgoing signals and to said receiver for deciphering incoming signals, said means including a delay circuit for introducing a desired order of delay in application of the coded key pulses to said receiver, means for selectively generating a plurality of different terminal-identifying signals equal in number to that of the terminals in the system for transmission out with enciphered signals from said transmitter one at a time for selected intervals, whereby each terminal may be differently identified for such intervals, means responsive to a terminal-identifying signal incoming at said receiver to code the key pulses from said generator respective to said received terminal-identifying signal, and means responsive to the terminal-identifying signal being generated during a selected interval for selectively coding the pulses supplied to said transmitter for enciphering purposes in a respective one of a like plurality of different codes.

4. In a two-way privacy system, two or more two-way terminals each comprising a transmitter and a receiver, a common key generator for said transmitter and receiver for producing at each terminal duplicate series of key pulses, means for supplying coded key pulses from said generator to said transmitter for enciphering outgoing signals and to said receiver for deciphering incoming signals, means for selectively generating a number of different terminal-identifying signals corresponding to the number of terminals in the system for differently identifying the terminal at selected intervals, whereby the terminal-identifying signals may be successively reassigned among the terminals of the system, and means respoonsive to the terminal-identifying signal generated during a selected interval at the terminal selectively coding the pulses supplied to said transmitter to a respective one of a like number of different codes.

5. In a two-way privacy system, two or more two-way terminals each comprising a transmitter and a receiver, a common key generator for said transmitter and receiver, means for supplying coded key pulses from said generator to said transmitter for enciphering outgoing signals and to said receiver for deciphering incoming signals, said means including a delay circuit for introducing a desired order of delay in application of the coded key pulses to said receiver, means for selectively generating a number of different terminal-identifying signals corresponding to the number of terminals in the system, a different one of which identifying-signals is generated at each terminal of the system during a selected interval, means responsive to a terminal-identifying signal incoming at said receiver to code the key pulses from said generator respective to said received terminal-identifying signal, and means responsive to the generation of a different one of the terminal-identifying signals at the terminal upon reassignment of said identifying signals among the terminals in a succeeding interval, for selectively coding the key pulses supplied to said transmitter in a respective one of a like number of different codes.

6. In a privacy system, two or more terminals each comprising a transmitter of enciphered message signals and a terminal-identifying signal, a key pulse generator, means for supplying coded key pulses from said generator to said transmitter for enciphering outgoing message signals, means for selectively generating a number of terminal-identifying signals corresponding to the number of terminals in the system for transmission with the enciphered out-going message signals for differently identifying the terminal at selected intervals, and means responsive to each said different terminal-identifying signal for correspondingly selectively coding the key pulses supplied to said transmitter in a respective one of a like number of different codes.

7. In a privacy system, a terminal comprising a transmitter of enciphered message signals and a terminal-identifying signal, means for supplying coded key pulses to said transmitter for enciphering outgoing message signals, means for selectively generating a plurality of different terminal-identifying signals for transmission one at a time with enciphered message signals, so that for successive selected intervals the identifying signal assigned to the terminal may be changed, and means responsive to said last-mentioned means for correspondingly selectively coding the pulses supplied to the transmitter to a respective one of a like number of different codes upon selective generation of a different identifying signal for the terminal.

8. In a privacy system, a terminal comprising a transmitter of enciphered message signals and a terminal-identifying signal, means for supplying coded key pulses to said transmitter for enciphering outgoing message signals and means for selectively generating a plurality of different terminal-identifying signals whereby a different identifying signal is assignable to the terminal at selected intervals and for correspondingly selectively coding the pulses supplied to the transmitter in a respective one of a like plurality of different codes.

* * * * *